US011502488B2

(12) United States Patent
Fariello et al.

(10) Patent No.: US 11,502,488 B2
(45) Date of Patent: Nov. 15, 2022

(54) CABLE MANAGEMENT ASSEMBLY FOR VARIABLE LENGTH CABLES

(71) Applicant: COMMSCOPE, INC. OF NORTH CAROLINA, Hickory, NC (US)

(72) Inventors: Patrick Lee Fariello, Murphy, TX (US); Gordon C. Spisany, McKinney, TX (US); Craig Bryan Wilson, Allen, TX (US); Darshan Patell, Plano, TX (US); Brian J. Hanchey, Lucas, TX (US); Rodney A. Willis, Sachse, TX (US)

(73) Assignee: CommScope Inc. of North Carolina, Hickory, NC (US)

( * ) Notice: Subject to any disclaimer, the term of this patent is extended or adjusted under 35 U.S.C. 154(b) by 0 days.

(21) Appl. No.: 16/092,100

(22) PCT Filed: Apr. 5, 2017

(86) PCT No.: PCT/US2017/026138
§ 371 (c)(1),
(2) Date: Oct. 8, 2018

(87) PCT Pub. No.: WO2017/176879
PCT Pub. Date: Oct. 12, 2017

(65) Prior Publication Data
US 2019/0075375 A1    Mar. 7, 2019

Related U.S. Application Data

(60) Provisional application No. 62/319,890, filed on Apr. 8, 2016.

(51) Int. Cl.
*H02G 3/04* (2006.01)
*H04Q 1/02* (2006.01)

(52) U.S. Cl.
CPC ............. *H02G 3/0437* (2013.01); *H04Q 1/02* (2013.01)

(58) Field of Classification Search
CPC .. H05K 7/1491; H05K 7/1447; H05K 7/1448; H05K 7/1449; H04Q 1/06
See application file for complete search history.

(56) References Cited

U.S. PATENT DOCUMENTS 6,011,221 A * 1/2000 Lecinski .............. H02G 3/0487
174/136
6,489,565 B1 * 12/2002 Krietzman ............. H02G 3/045
174/101

(Continued)

FOREIGN PATENT DOCUMENTS

CN    104051873 A    9/2014
CN    105322472 A *  2/2016

(Continued)

OTHER PUBLICATIONS

International Search Report and Written Opinion of the International Searching Authority for International Patent Application No. PCT/US2017/026138 dated Jul. 17, 2017, 13 pages.

*Primary Examiner* — Jinhee J Lee
*Assistant Examiner* — Douglas R Burtner
(74) *Attorney, Agent, or Firm* — Merchant & Gould P.C.

(57) ABSTRACT

A cable management assembly is disclosed that can be completely factory assembled and shipped to a site for later mounting directly to a telecommunications rack or cabinet. The cable management assembly includes a plurality of cables secured within a carrier assembly. In one aspect, the cables have different or customized individual lengths. The carrier assembly can include a bracket portion and a plurality of cable management members extending from the bracket portion. The plurality of cable management members can define a plurality of cable routing apertures through (Continued)

which at least some of the plurality of cables extend. The bracket portion is mountable to a telecommunications rack with the plurality of cables mounted within the carrier assembly.

16 Claims, 12 Drawing Sheets

(56) References Cited

U.S. PATENT DOCUMENTS

| | | | | |
|---|---|---|---|---|
| 6,629,675 B1 * | 10/2003 | Bjorklund | | H02G 3/30 |
| | | | | 248/68.1 |
| 6,809,258 B1 * | 10/2004 | Dang | | G02B 6/4453 |
| | | | | 174/64 |
| 7,194,181 B2 * | 3/2007 | Holmberg | | G02B 6/4452 |
| | | | | 385/134 |
| 7,200,317 B2 * | 4/2007 | Reagan | | H04Q 1/021 |
| | | | | 385/139 |
| 7,333,707 B2 * | 2/2008 | Puetz | | G02B 6/445 |
| | | | | 385/135 |
| 7,417,188 B2 * | 8/2008 | McNutt | | H02G 3/045 |
| | | | | 174/101 |
| 7,672,561 B1 * | 3/2010 | Keith | | H04Q 1/06 |
| | | | | 385/59 |
| RE41,353 E * | 5/2010 | McGrath | | H04Q 1/068 |
| | | | | 379/327 |
| 7,756,380 B2 * | 7/2010 | Ruiz | | G02B 6/4452 |
| | | | | 385/136 |
| 7,893,567 B1 * | 2/2011 | Deros | | H02G 3/388 |
| | | | | 307/42 |
| 7,963,486 B2 * | 6/2011 | Wilson | | H04Q 1/062 |
| | | | | 174/101 |
| 8,220,881 B2 * | 7/2012 | Keith | | E05D 15/50 |
| | | | | 49/382 |
| 8,363,998 B2 * | 1/2013 | Newman | | H04Q 1/035 |
| | | | | 385/135 |
| 8,605,459 B2 * | 12/2013 | Papakos | | G06F 1/20 |
| | | | | 361/825 |
| 9,042,701 B2 * | 5/2015 | Dagley | | B65H 75/22 |
| | | | | 385/136 |
| 9,054,506 B2 * | 6/2015 | Krietzman | | H02B 1/04 |
| 9,069,149 B2 | 6/2015 | Yu | | |
| 9,212,765 B1 * | 12/2015 | Chia | | F16L 3/127 |
| 10,237,994 B2 * | 3/2019 | Donowho | | H05K 7/183 |
| 2005/0016617 A1 * | 1/2005 | Spain | | H04Q 1/023 |
| | | | | 140/123 |
| 2005/0076479 A1 * | 4/2005 | Rolla | | H05K 7/1449 |
| | | | | 24/302 |
| 2006/0269207 A1 * | 11/2006 | Ivancevic | | H04Q 1/06 |
| | | | | 385/135 |
| 2007/0190815 A1 * | 8/2007 | Sampson | | H04Q 1/021 |
| | | | | 439/49 |
| 2009/0194647 A1 * | 8/2009 | Keith | | H04Q 1/13 |
| | | | | 248/68.1 |
| 2009/0206217 A1 * | 8/2009 | Wilson | | H04Q 1/062 |
| | | | | 248/207 |
| 2010/0085726 A1 * | 4/2010 | Blomquist | | H04Q 1/066 |
| | | | | 361/825 |
| 2010/0193754 A1 * | 8/2010 | Garza | | H02G 3/0456 |
| | | | | 254/134.3 CL |
| 2010/0296789 A1 | 11/2010 | Womack et al. | | |
| 2011/0155674 A1 * | 6/2011 | Knight | | H05K 7/186 |
| | | | | 211/26 |
| 2011/0180295 A1 * | 7/2011 | Krietzman | | H02G 3/0418 |
| | | | | 174/50 |
| 2011/0228473 A1 * | 9/2011 | Anderson | | H05K 7/1487 |
| | | | | 361/679.02 |
| 2011/0262097 A1 * | 10/2011 | Hruby | | G02B 6/4452 |
| | | | | 361/827 |
| 2012/0267991 A1 * | 10/2012 | Adducci | | H02B 1/202 |
| | | | | 312/223.2 |
| 2015/0077935 A1 * | 3/2015 | Wright | | H05K 7/1491 |
| | | | | 248/65 |
| 2016/0048610 A1 * | 2/2016 | Cox | | G06F 30/394 |
| | | | | 703/1 |
| 2017/0290192 A1 * | 10/2017 | Goergen | | G02B 6/4478 |
| 2018/0048130 A1 * | 2/2018 | Chen | | A47B 88/49 |
| 2018/0063987 A1 * | 3/2018 | Chen | | H02G 11/006 |

FOREIGN PATENT DOCUMENTS

| | | |
|---|---|---|
| CN | 105322472 A | 2/2016 |
| EP | 2 973 879 B1 | 5/2018 |

* cited by examiner

US 11,502,488 B2

CABLE MANAGEMENT ASSEMBLY FOR VARIABLE LENGTH CABLES

CROSS-REFERENCE TO RELATED APPLICATION

This application is a National Stage of PCT/US2017/026138, filed on Apr. 5, 2017, which claims the benefit of U.S. Patent Application Ser. No. 62/319,890, filed on Apr. 8, 2016, the disclosures of which are incorporated herein by reference in their entireties. To the extent appropriate, a claim of priority is made to each of the above disclosed applications.

FIELD OF THE INVENTION

The present invention relates to cable management systems for telecommunications cables.

BACKGROUND OF THE INVENTION

Suppliers and users of structured connectivity communications systems in local area networks often have difficulty managing the cabling and demarcation and patching points such as in communications closets and computer rooms. Here, large numbers of data, voice, and video communications circuits, cables and connectors may be concentrated into small areas on relay racks and in communications cabinets resulting in congestion of cabling and connectors. Some connectivity systems attempt to ease the congestion of cabling and connectors by integrating cable management devices within and around the racks and cabinets. However, the use of such management devices generally requires manual routing of cables in the field, which can be time consuming and expensive. Minimizing the space consumed by the cable management systems, and managing the cable in an efficient manner are desired.

SUMMARY OF THE INVENTION

One aspect of the present disclosure relates to a cable management assembly including a plurality of cables secured within a carrier assembly. In one aspect, the cables have different or customized individual lengths. The carrier assembly can include a bracket portion and a plurality of cable management members extending from the bracket portion. The plurality of cable management members can define a plurality of cable routing apertures through which at least some of the plurality of cables extend. The bracket portion is mountable to a telecommunications rack with the plurality of cables mounted within the carrier assembly.

A method for assembling a factory built cable management assembly is also disclosed. The method can include the steps of: providing a carrier assembly having a bracket portion from which a plurality of cable management members extend to define a plurality of cable mounting apertures, the bracket portion being configured for being field mounted to a telecommunications rack; providing a plurality of cables, wherein at least some of the cables have a different length than at least some of the other cables; and routing the plurality of cables within the carrier assembly and through at least some of the cable mounting apertures. Once the cable management assembly is built in the factory or assembly site, the assembly can be shipped to a site, where the assembly can be mounted to a telecommunications rack and the cables can be connected to the equipment supported therein.

A method of installing a telecommunications system is also disclosed. The method can include the steps of: providing a pre-assembled cable management assembly including a plurality of cables, some of which having lengths that are different than lengths of others of the plurality of cables, and a carrier assembly including a plurality of cable management members defining a plurality of cable routing apertures through which at least some of the plurality of cables extend; mounting the carrier assembly to a telecommunications rack to which telecommunications components are secured; and connecting the plurality of cables to the telecommunications components.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
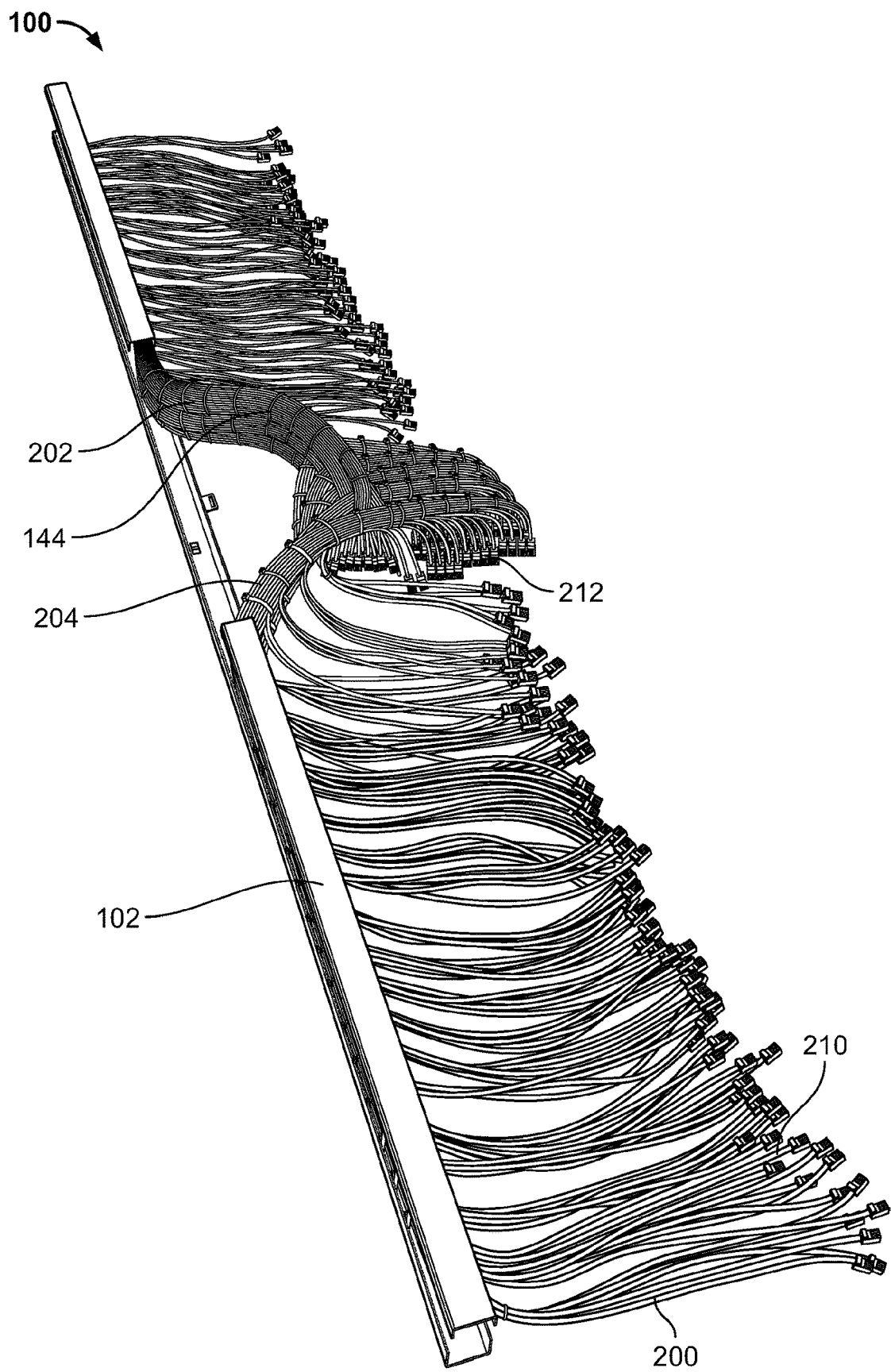
FIG. 1 is a side perspective view of an example cable management assembly in accordance with principles of the present disclosure.
Figure 2:
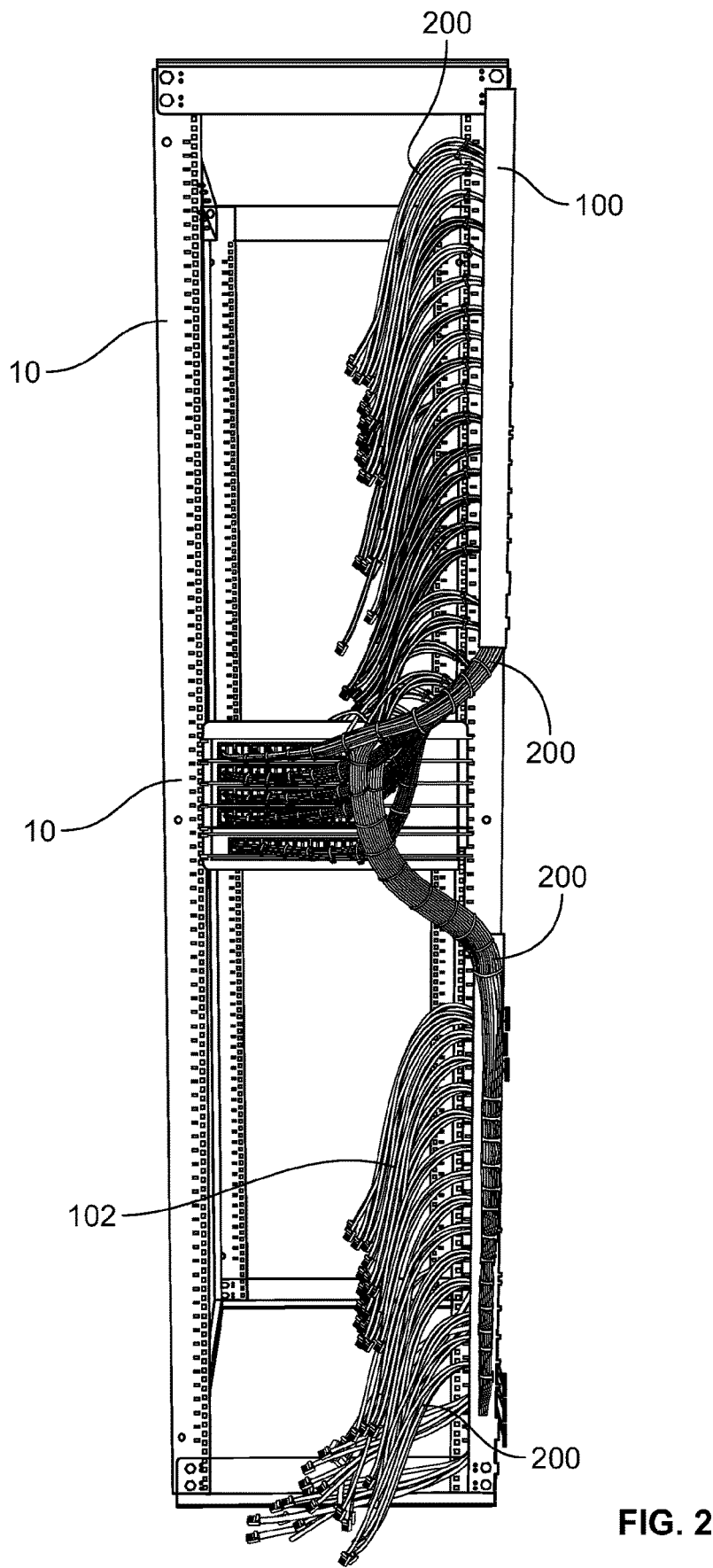
FIG. 2 is a front perspective view of the cable management assembly shown in FIG. 1 mounted to a telecommunications rack.
Figure 3:
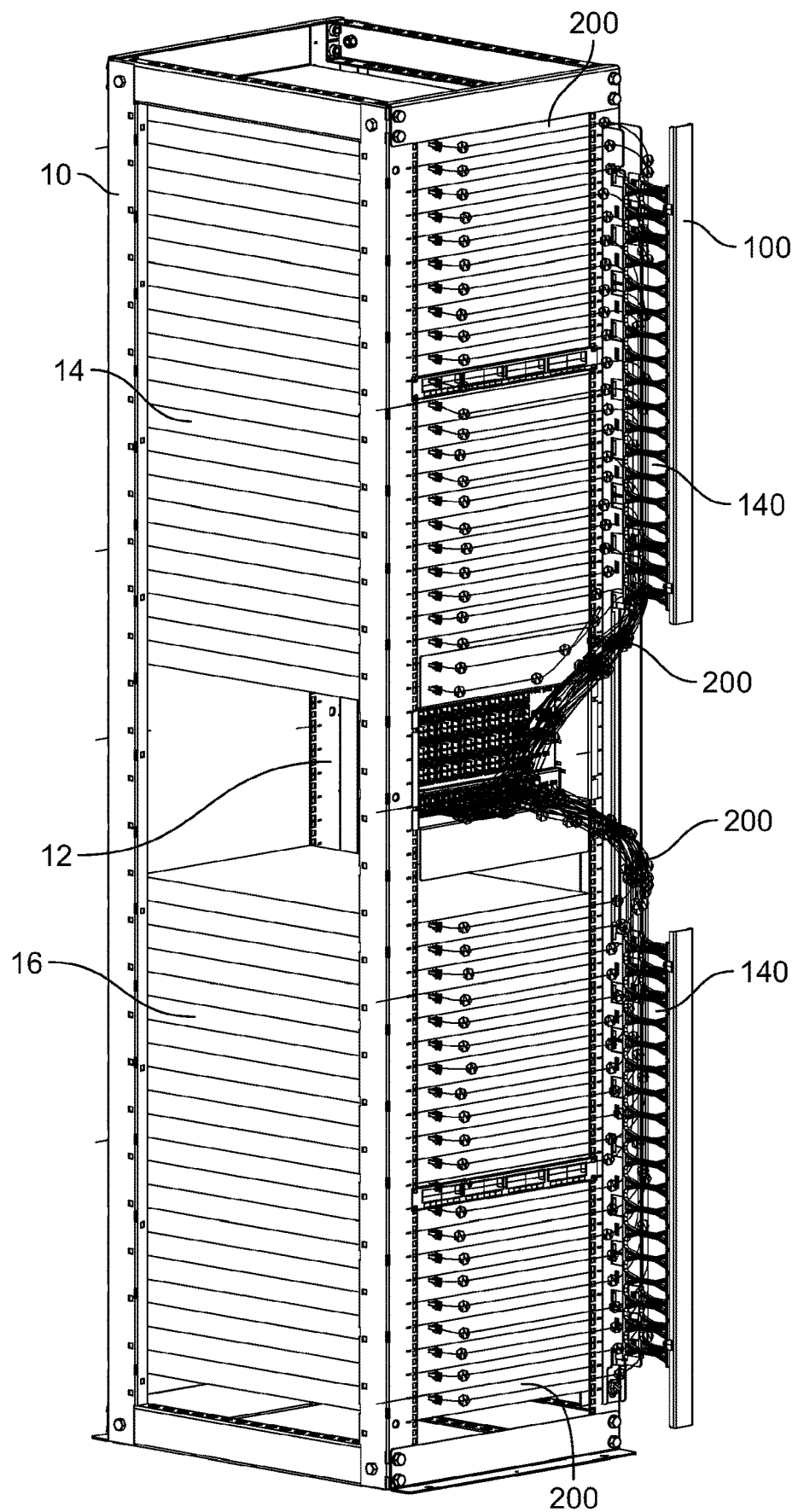
FIG. 3 is a side perspective view of a portion of the cable management assembly shown in FIG. 1 mounted to a telecommunications rack, wherein cables of the cable management assembly are connected to telecommunications components mounted in the telecommunications rack.
Figure 4:
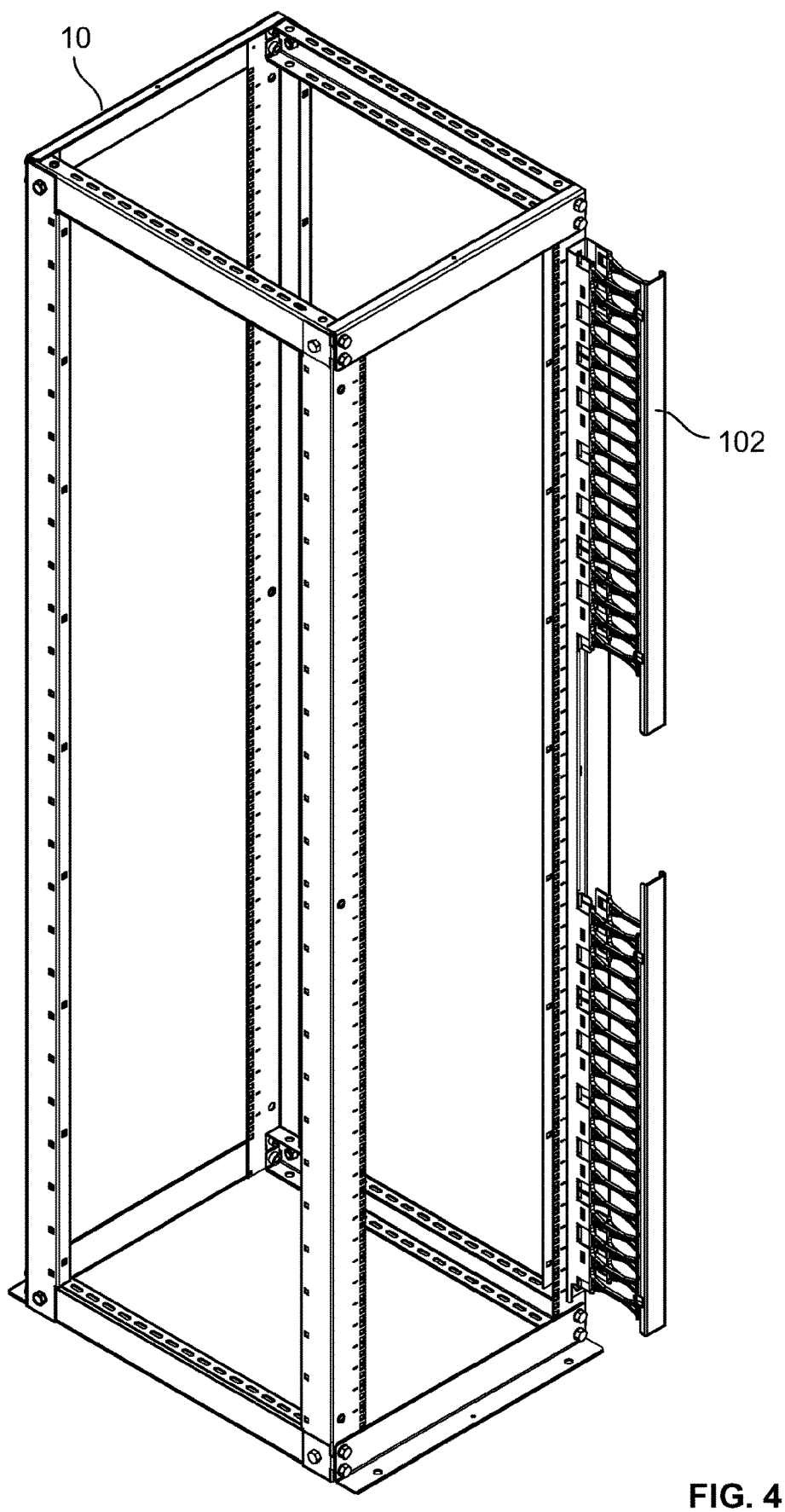
FIG. 4 is a side perspective view of a carrier assembly of the cable management assembly and telecommunications rack shown in FIG. 3, wherein the cables and telecommunications components are not shown.
Figure 5:
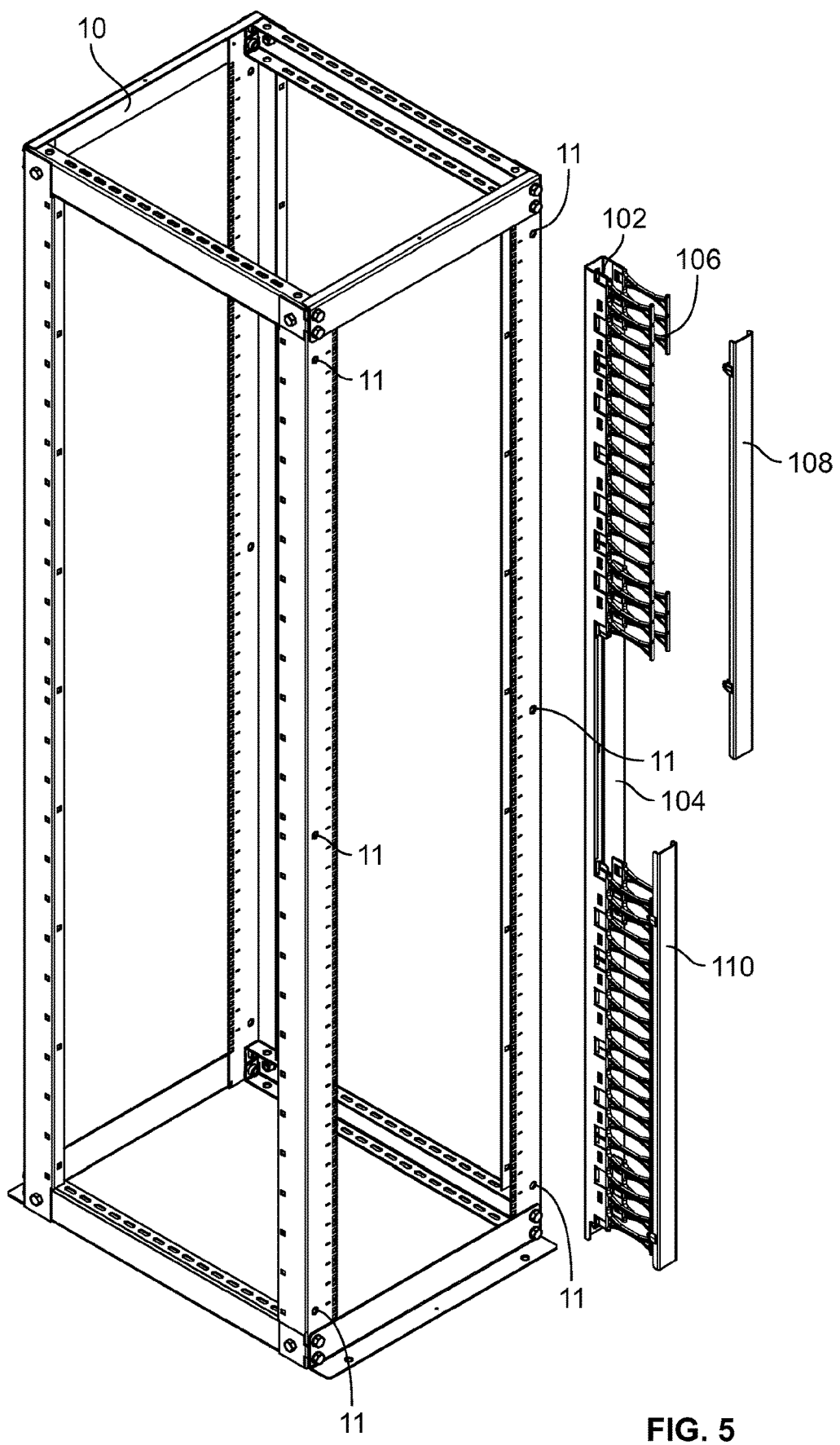
FIG. 5 is an exploded side perspective view of the portion of the carrier assembly and telecommunications rack shown in FIG. 4.
Figures 6, 7:
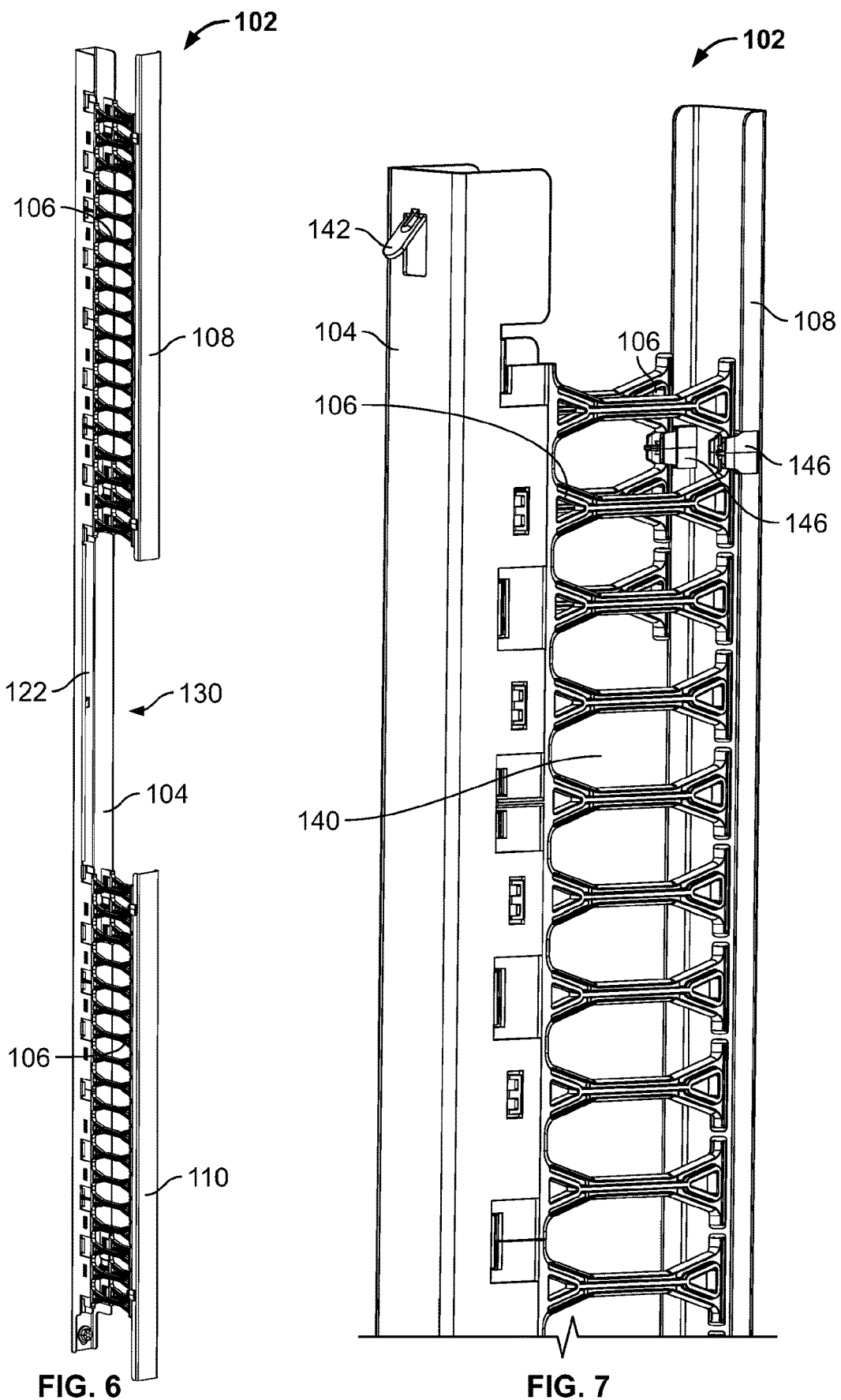
FIG. 6 is a front side perspective view of the carrier assembly shown in FIG. 4.
FIG. 7 is a rear side perspective view of a portion of the carrier assembly shown in FIG. 6.
Figure 8:
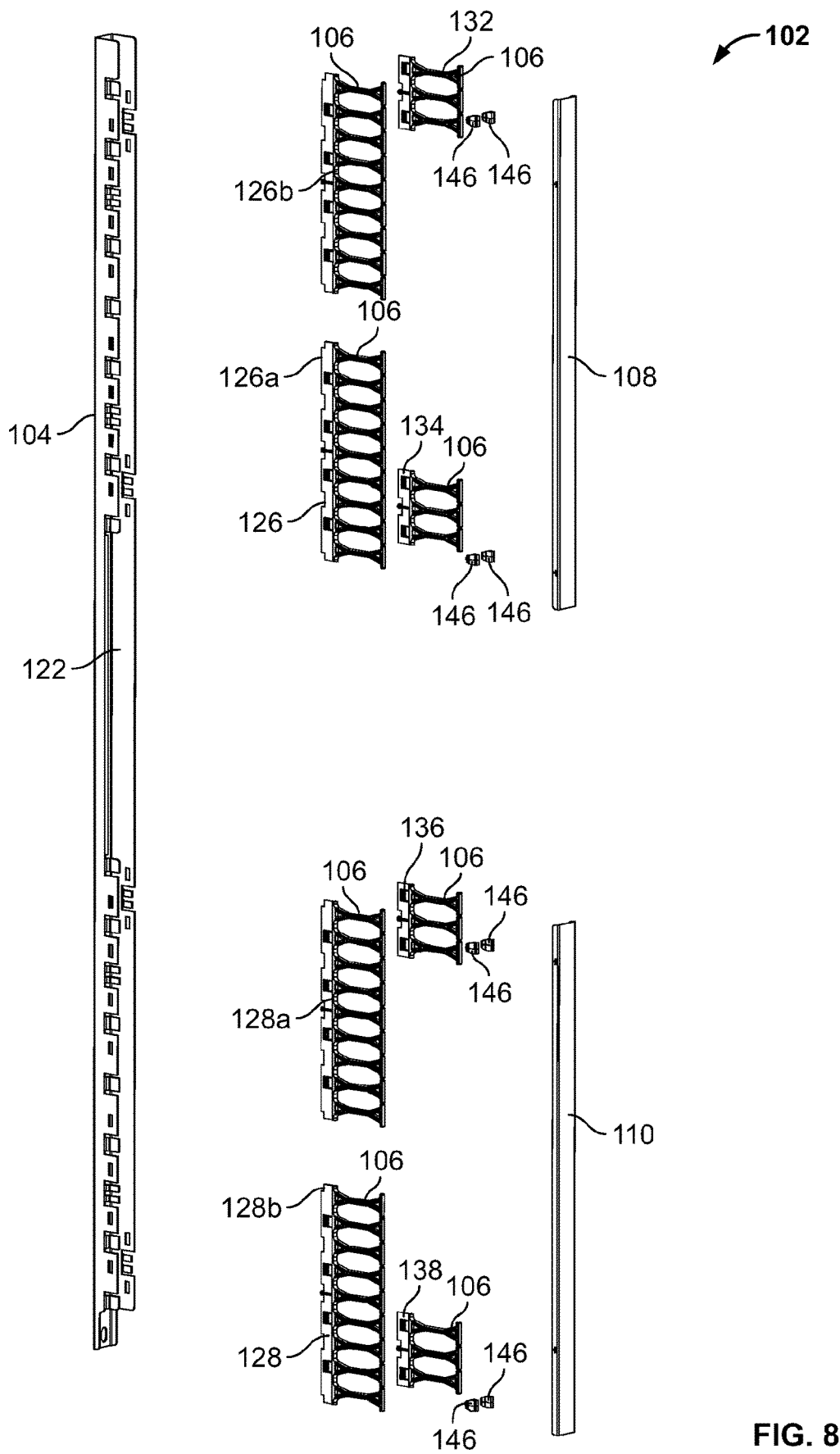
FIG. 8 is an exploded front side perspective view of the carrier assembly shown in FIG. 6.
Figure 9:
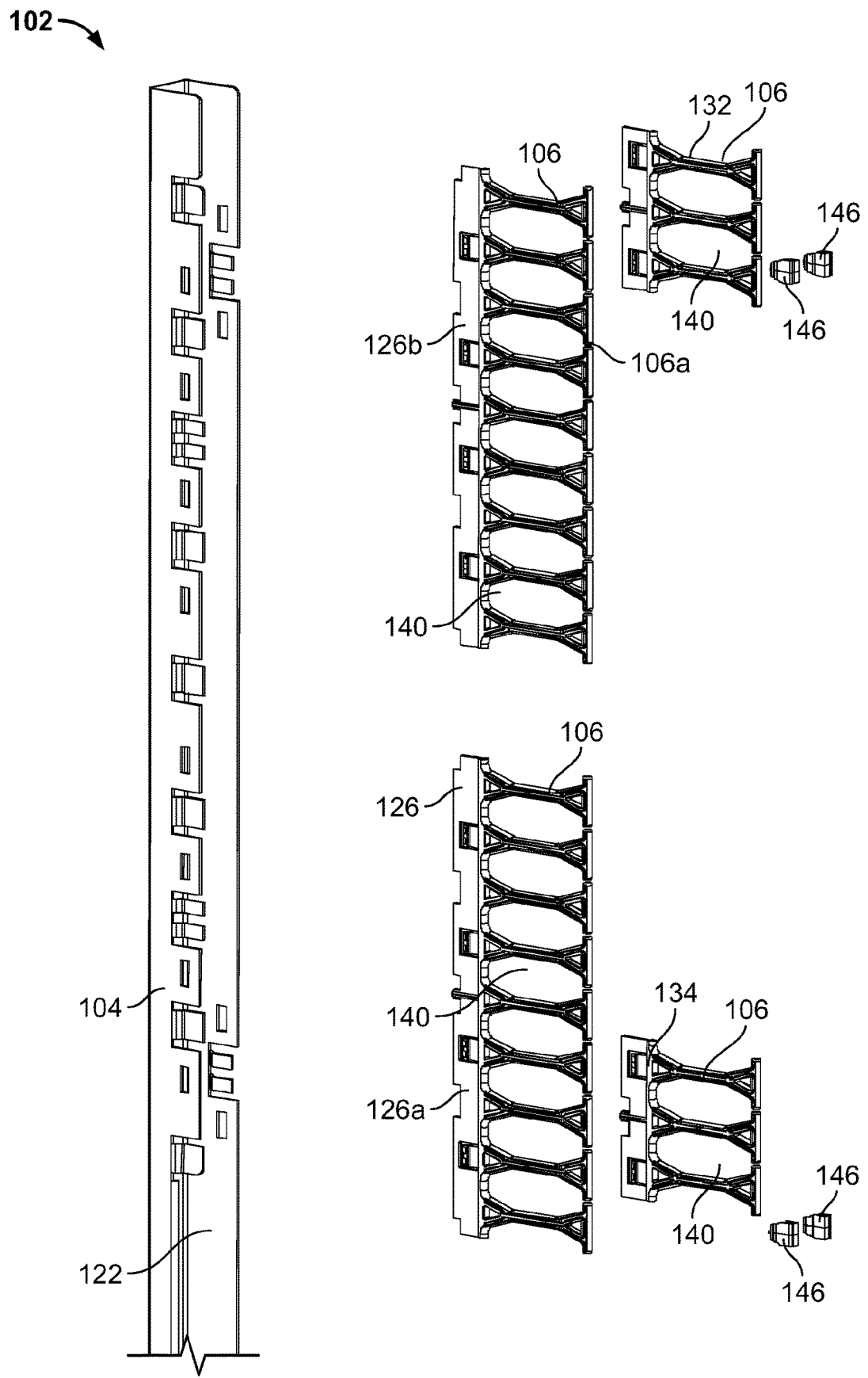
FIG. 9 an exploded front side perspective view of a portion of the carrier assembly shown in FIG. 6.
Figure 10:
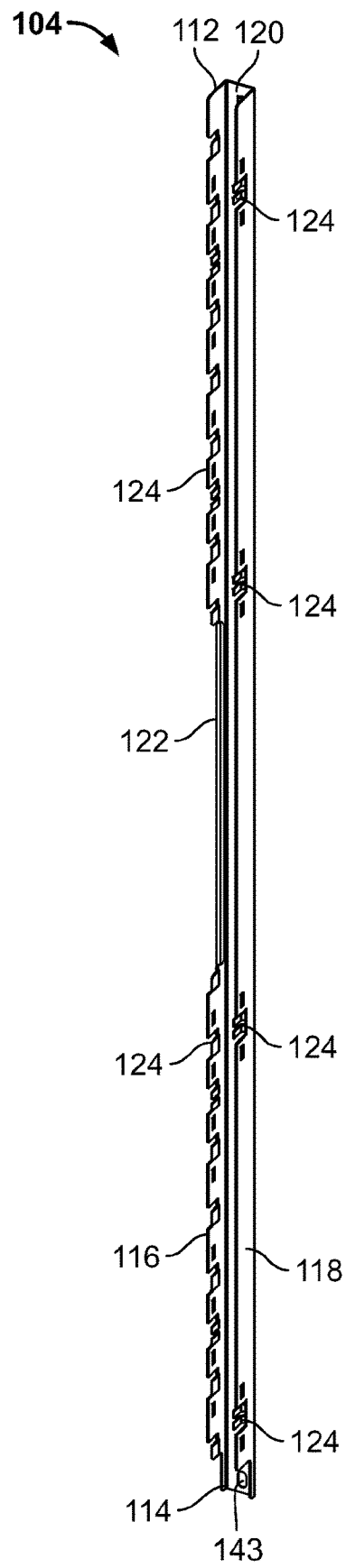
FIG. 10 is a front perspective view of a bracket portion of the carrier assembly shown in FIG. 6.
Figure 11:
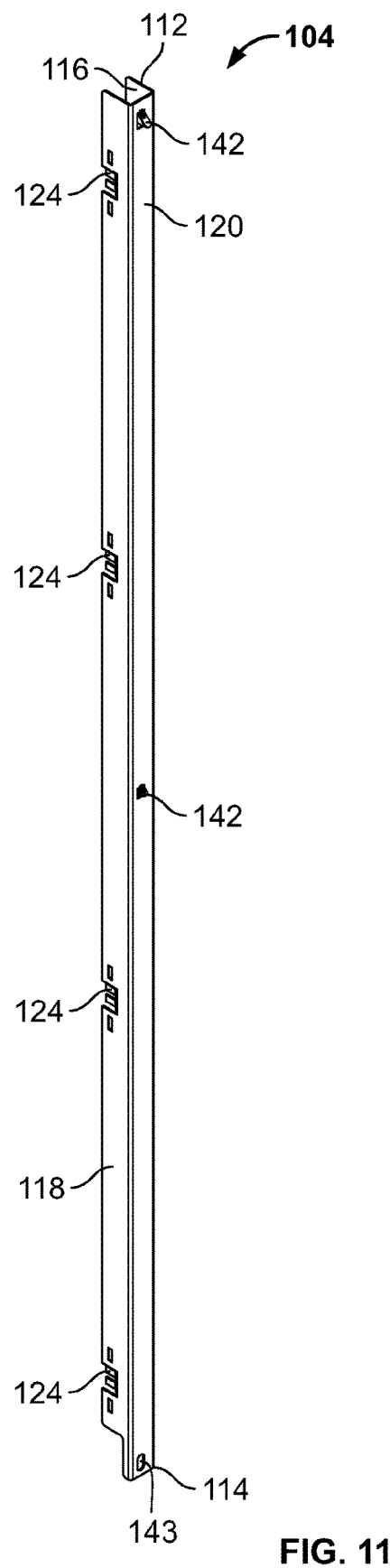
FIG. 11 is a rear perspective view of a bracket portion of the carrier assembly shown in FIG. 6.

A cable management assembly 100 for a telecommunications rack or cabinet 10 for managing cable in and around telecommunications equipment racks and cabinets is disclosed. In one example, the rack or cabinet 10 is configured with a plurality of telecommunications components 12, 14, 16. The cable management assembly 100 manages cables 200 routed between the telecommunications components 12, 14, and 16. In the example shown, each of the plurality of cables 200 is routed between one of a plurality of first telecommunication components, configured as switches 12, and one of a plurality of second or third telecommunication components, configured as servers 14, 16. However, it should be understood that the rack or cabinet 10 can include any number and/or configuration of telecommunications components. In one example, the cables 200 are copper based telecommunications cables (i.e. Category 5 cables) and are provided with RJ type plugs that are connected to respective jacks of the servers 14, 16 and switch panels 12. In the example shown, individual RJ type plugs 210 are provided at the cable ends to be connected to the servers 14, 16 while RJ type plug packs 212 (e.g. an 8 plug pack) are provided at the cable ends to be connected to the switch panels 12. The cables 200 may also be color coded (or provided with other indicia) and grouped as such to aid in identifying which cables are routed to a particular switch panel 12. Many other types of assemblies, cables, and connectors are possible, such as fiber optic cables with LC, SC, and/or MPO connectors.

In one aspect, the cable management assembly 100 includes a carrier assembly 102 to which the plurality of cables 200 are secured. The cable management assembly 100 can be completely factory assembled and can be later mounted directly to the rack or cabinet 10 in the field via the carrier assembly 102. An example of a factory assembled cable management assembly 100 is shown at FIG. 1, wherein it can be seen that one end of each of the cables 200 is centrally routed for connection to a jack associated with a switch panel 12 and the opposite end of each cable is routed for connection to a jack associated with a server 14, 16. As shown, each individual cable 200 is provided with a customized length such that the cable 200 can be routed from a first designated connection point at the first telecommunication component 12 to a second designated connection point at the second or third telecommunications component 14, 16 without requiring slack management of the cable 200. Because the cables can be cut, terminated, and mounted to the carrier assembly 102 in a factory setting, considerable time savings results in comparison to installations where cables are cut to length and terminated in the field. The disclosed configuration is also advantageous over field installations that use cables of the same length, as significant slack management structures are required to manage the unneeded excess cable lengths for shorter runs.

As shown, the carrier assembly 102 can include a bracket portion 104, a plurality of cable management members 106, an upper or first cover 108, and a lower or second cover 110. The bracket portion 104 extends between a first end 112 and a second end 114 and has a pair of sidewalls 116, 118 extending from an end wall 120 to form a channel shape. In the mounted position shown, the first sidewall 116 is closer to the telecommunications components 12, 14, 16 than is a corresponding portion of the second sidewall 118. To provide an opening space for the cables 200 as they extend away from the bracket portion 104 and towards the telecommunications component 12. The first sidewall 116 has a notched section 122. It is noted that the carrier assembly 102 can be constructed and configured to mount to the opposite side (i.e. left side) of the rack 10 or to either side of the rear end of the rack 10 without departing from the concepts herein.

Each of the first and second sidewalls 116, 118 includes connection points 124 to which the cable management members 106 can be attached. In one example, the connection points 124 are formed by apertures and notches within the sidewalls 116, 118 that enable a snap-fit connection with corresponding protrusions located on the cable management members 106. The cable management members 106 can be grouped together in a larger assembly that is attached to the sidewalls 116, 118 or can be provided as individual elements that are individually attached to the sidewalls 116, 118. Many possible configurations exist. For example, the cable management members 106 and the sidewalls 116, 118 can be integrally formed as a single part.

In the example shown, a first unit group 126 unit having 18 cable management members 106, formed from two separate sub units 126a, 126b, is mounted to the first sidewall 116 proximate the first end 112 and a second unit group 128 having 18 cable management members 106, formed from two separate sub units 128a, 128b, is mounted to the first sidewall 116 proximate the second end 114 with a resulting gap 130 aligning with notched section 122 being formed. A third unit group 132 including three cable management members 106 is mounted to the second sidewall 118 proximate the first end 112 and opposite the unit group 126. A fourth unit group 134 including three cable management members 106 is mounted to the second sidewall 118 proximate the gap 130 and opposite the unit group 126. A fifth unit group 136 including three cable management members 106 is mounted to the second sidewall 118 proximate the gap 130 and opposite the unit group 128. A sixth unit group 138 including three cable management members 106 is mounted to the second sidewall 118 proximate the second end 114 and opposite the unit group 128. Although the example shown in the drawings shows a particular configuration of unit groups, the disclosure is not limited to any specific embodiment. Rather, many other arrangements are possible. For example, the entire length of the bracket portion 104 can be provided with cable management members along one or both of the sidewalls 116, 118.

As stated previously, the cable management assembly 100 can be provided with covers 108, 110. The first cover 108 can be provided and respectively attached to cable management members 106 associated with the first, third, and fourth unit groups 126, 132, 134. Similarly, the second cover 110 can be provided and respectively attached to cable management members 106 associated with the second, fifth, and sixth unit groups 128, 136, 138. The covers 108, 110 aid in securing the cables 200 within the carrier assembly 102 and also provide structural rigidity to the overall structure.

Figure 12:
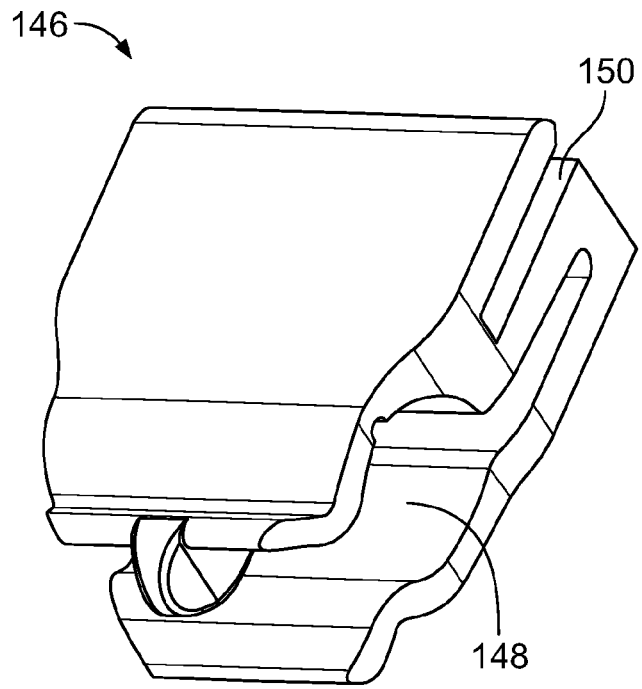
FIG. 12 is a top perspective view of a fastener of the carrier assembly shown in FIG. 6.
Figure 13:
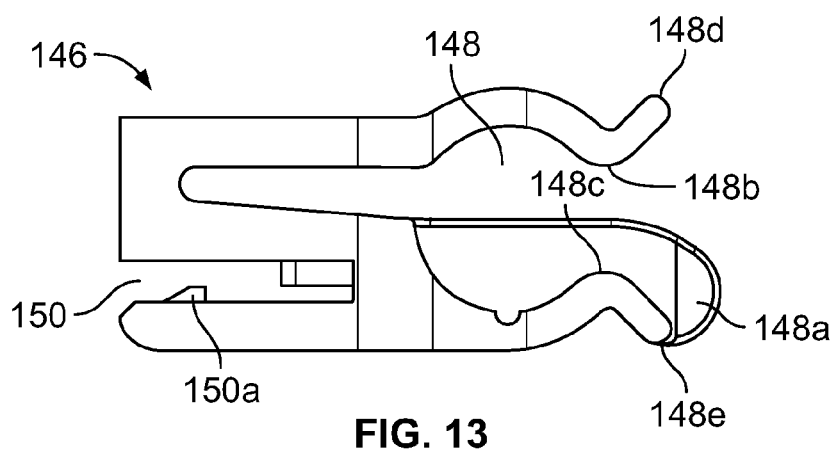
FIG. 13 is a side view of the fastener shown in FIG. 12.

Each of the covers 108, 110 can be attached to the cable management member unit groups via fasteners 146. In the particular example shown, the fasteners 146 are provided as clips 146 which are shown in further detail at FIGS. 12 and 13. As shown, each clip has a first clip portion 148 for engaging with the cable management members 106 in a snap-fit manner. The first clip portion 148 includes a nose portion 148a which extends into a gap 106a between two adjacent cable management members 106. The first clip portion 148 also includes engagement portions 148b, 148c which snap over and engage with a top portion 106a of two adjacent cable management members 106. The engagement portions 148b, 148c are flared outwards at ends 148d, 148e to allow for the clip 146 to be positioned over and guided onto the cable management members 106. Each clip also has a second clip portion 150 for engaging with the bracket portion 104. As shown the clip portion 150 defines a slot within which a protrusion extends for engaging in a snap-fit manner with the covers 108, 110.

When the example shown is assembled, an upper trunk 202 of cables 200 is routed from the gap 130 and between the first and fourth unit groups 126, 134. The cables 200 branch off from the upper trunk 202 in smaller groups. Some of the cables 200 branch off before the upper trunk 202 reaches the cable management members 106 while the remaining cables 202 branch off through the appropriate cable apertures 140 formed between the cable management members 106 associated with the first unit group 126. The third and fourth unit groups 132, 134 aid in retaining the upper trunk 202 within the carrier assembly 102 in conjunction with the cover 108. Once the cables 200 associated with the upper trunk 202 are adequately routed, the cables 200 can be bundled together and/or can be secured to the carrier assembly with banding 144, as is shown at FIG. 1. In one method, the factory routing of the cables 200 is be performed with the cable management members 106 mounted to the bracket portion 104 with the cover 108 removed such that the cables can be routed through the gaps 106*a* between the cable management members 106. The cable management members 106 are provided with sufficient flexibility such that they can be laterally deflected to increase the size of the gaps 106*a*. The cover 108 can be attached to the cable management members 106 after routing of the cables 200 is completed. A lower trunk 204 of cables 200 is shown as being similarly routed, but from the gap 130 towards the second and fifth unit groups 128, 136. While the above configuration is useful for a particular rack configuration, the disclosure is not limited to such an implementation. Rather, the location of the extension members 106 and the specific routing of the cables 200 can be provided in any configuration to match a desired installation for a particular rack 10 having telecommunications components that need to be interconnected.

Once factory assembled, the cable management assembly 100 can be shipped and then mounted to a telecommunications rack 10. To facilitate mounting, the end wall 120 can be provided with structures that allow for attachment to the rack 10. In the example shown, the bracket portion 104 is provided with hanger tabs 142 that align with corresponding apertures 11 in the rack 10. The hanger tabs 142 are integrally formed and bent from the bracket portion 104, but may be a separate component that is attached to the bracket portion 104. The bracket portion 104 is also provided with an aperture 143 through which fasteners, such as bolts can be inserted to further secure the bracket portion 104 to the rack 10. Alternatively, the rack 10 can be provided with studs, hanger elements, and/or protrusions and the bracket portion 104 can be provided with apertures configured with a corresponding shape for connection thereto, such as a keyhole slot. Once the cable management assembly 100 is mounted to the rack or cabinet 10, the cables 200 can then be connected to the telecommunications components mounted within the rack or cabinet 10.

One aspect of the present disclosure relates to a cable management assembly including a plurality of cables secured within a carrier assembly. In one aspect, the cables have different or customized individual lengths. The carrier assembly can include a bracket portion and a plurality of cable management members extending from the bracket portion. The plurality of cable management members can define a plurality of cable routing apertures through which at least some of the plurality of cables extend. The bracket portion is mountable to a telecommunications rack with the plurality of cables mounted within the carrier assembly.

In one embodiment, the cables are terminated patch cords with both ends terminated with telecommunications connectors, such as fiber, copper, or hybrid. In one embodiment, the carrier assembly includes a single vertical channel when mounted to a rack. In one embodiment, the carrier assembly includes access passages for cables to extend horizontally from the carrier assembly. In one embodiment, the cables are tied, affixed or attached to each other and/or to the carrier assembly before the carrier assembly is mounted to the rack. In one embodiment, the carrier assembly is mounted only on one side of the rack. In one embodiment, each of the cables connects a lower connection point to an upper connection point in the same rack. In one embodiment, the cables either connect a lower connection point to a middle portion with a first connection point, and/or an upper connection point to a middle portion with a second connection point, all in the same rack. In one embodiment, the cables have at least two different lengths from the carrier assembly when comparing cables in the same horizontal row. In one embodiment, the cables have the same lengths from the carrier assembly when comparing cables in the same horizontal row. In one embodiment, the cables extend from a multi-pack of terminated cables such as plugs to individual terminations such as plugs. In one embodiment, the carrier assembly is configured to be mounted to the rack when the carrier assembly is full or at least partially full of cables. The mounting mechanism for mounting the carrier assembly to the rack is accessible for mounting the carrier assembly to the rack when the carrier assembly is full or at least partially full of cables. In one embodiment, the carrier assembly includes an exposed surface, such as a rear surface, facing a portion of the rack, wherein the exposed surface includes at least part of the mounting mechanism accessible for mounting the carrier assembly to the rack when the carrier assembly is full or at least partially full of cables.

A method for assembling a factory built cable management assembly is provided. The method can include the steps of: providing a carrier assembly having a bracket portion from which a plurality of cable management members extend to define a plurality of cable mounting apertures, the bracket portion being configured for being field mounted to a telecommunications rack; providing a plurality of cables, wherein at least some of the cables have a different length than at least some of the other cables; and routing the plurality of cables within the carrier assembly and through at least some of the cable mounting apertures. Once the cable management assembly is built in the factory, the assembly can be shipped to a site, where the assembly can be mounted to a telecommunications rack and the cables can be connected to the equipment supported therein at day 1 and/or at day 2. In one method, the carrier assembly is mounted vertically, and the cables extend vertically, and then horizontally to equipment when mounted to a rack.

A method of installing a telecommunications system is also provided. The method can include the steps of: providing a factory assembled cable management assembly including a plurality of cables, some of which having lengths that are different than lengths of others of the plurality of cables, and a carrier assembly including a plurality of cable management members defining a plurality of cable routing apertures through which at least some of the plurality of cables extend; mounting the carrier assembly to a telecommunications rack to which telecommunications components are secured; and connecting the plurality of cables to the telecommunications components at day 1 and/or at day 2. In one method, the carrier assembly is mounted vertically, and the cables extend vertically, and then horizontally to equipment when mounted to a rack.

Figure 14:
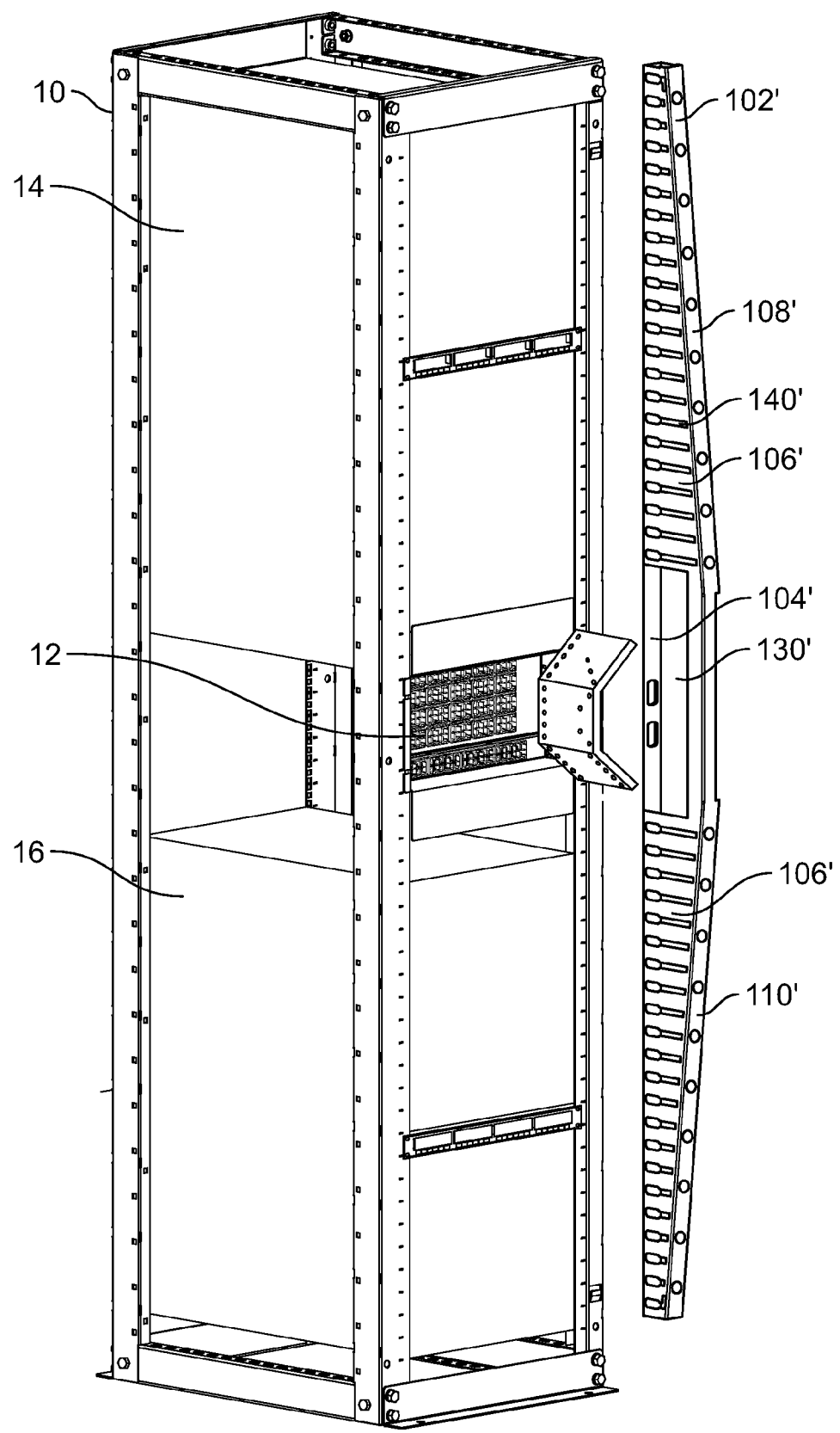
FIG. 14 is a exploded front perspective view of a second example of a carrier assembly and a telecommunications cabinet.
Figure 15:
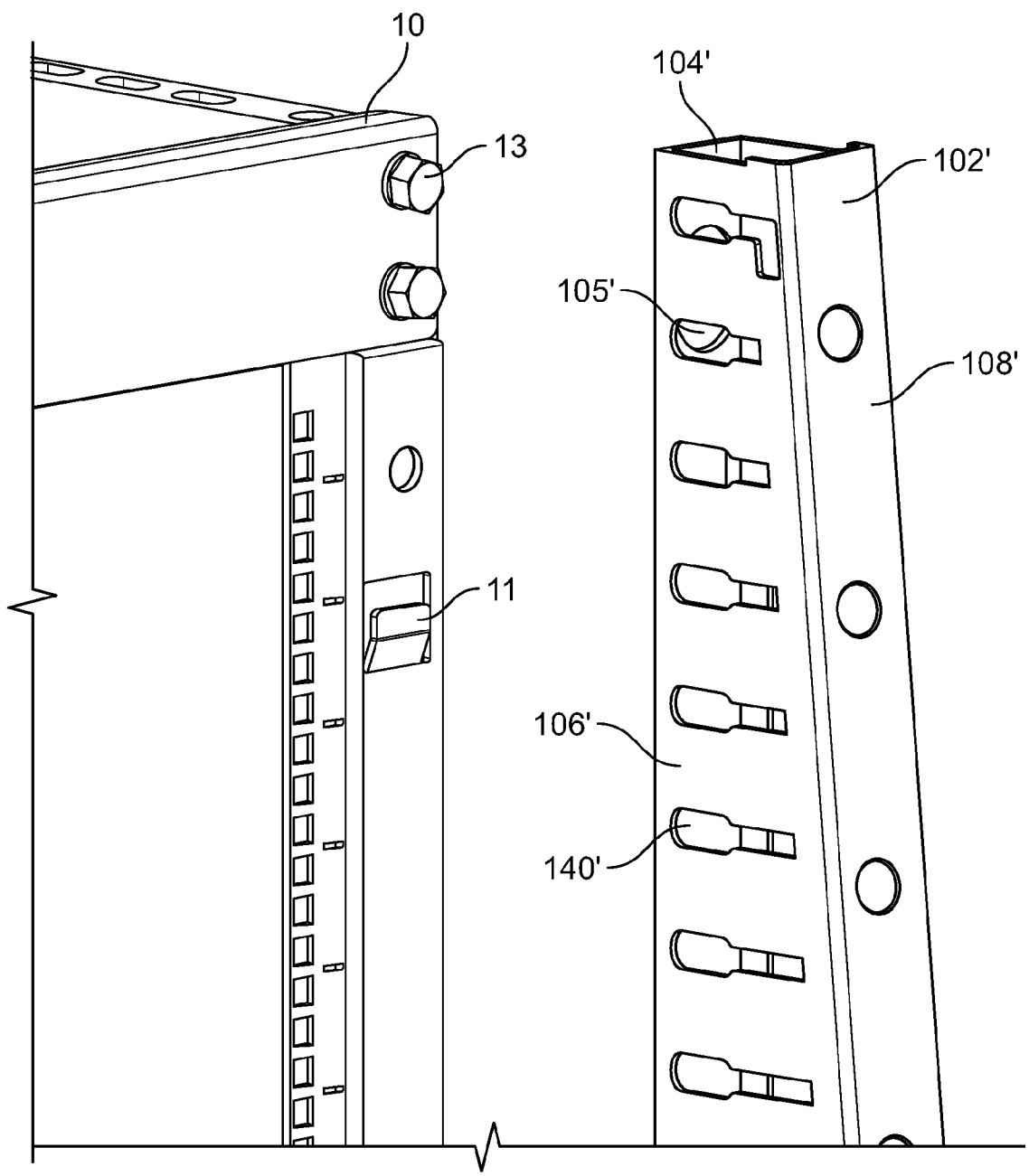
FIG. 15 is a front perspective view of a portion of the carrier assembly and the telecommunications cabinet shown in FIG. 14.

Referring to FIGS. 14 and 15, and alternative configuration of the cable management assembly 100' is shown. Where like or similar features or elements are shown, corresponding or like reference numbers will be used where possible. Many of the concepts and features of the second embodiment are similar to the first embodiment. As such, the description for the first embodiment is applicable for the second embodiment. The description for the second embodiment will be limited to the differences between the first and second embodiments. The primary difference between the embodiments is that the carrier assembly 100' is configured as an integrally formed unit in which the bracket portion 104', the cable management members 106', and the covers 108', 110' are formed from a single sheet of material. Accordingly, the apertures 140' through which the cables 200 extend are formed as openings or slots through horizontal segments 106' extending between the bracket portion 104' and the covers 108', 110'. Also, the portion of material that forms the covers 108', 110' also extends across the gap 130' such that the gap 130' is enclosed. The carrier 102' of this embodiment is also formed with mounting apertures to engage with hanger tabs 11' on the cabinet 10' such that the carrier 102' can be mounted to the cabinet 10'. The carrier 102' further includes apertures 105' that receive the bolt heads associated with the rack 10 to allow the carrier 102' to be flush mounted against the rack 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable management assembly separate from and installable onto a telecommunications rack, the cable management assembly comprising:
    (a) a plurality of cables terminated with connectors at each end, some of which have lengths that are different than lengths of others of the plurality of cables; and
    (b) a carrier assembly supporting the plurality of cables and including:
        a bracket including first and second sidewalls extending from an end wall to define an open channel, wherein the bracket includes at least one mounting feature located on the end wall at a location across which the plurality of cables do not extend such that the bracket can be mounted to the telecommunications rack with the plurality of cables supported by the carrier assembly;
        a plurality of cable management members extending from the bracket, the plurality of cable management members defining a plurality of cable routing apertures, the bracket being mountable to a telecommunications rack with the plurality of cables mounted within the carrier assembly; and
        a first cover connected to and supported by distal ends of the plurality of cable management members and facing the bracket end wall, the first cover, the bracket, and the plurality of cable management members cooperatively defining a passageway extending along a length of the bracket from a first longitudinal end to a second longitudinal end;
    (c) wherein the plurality of cables extend through the passageway such that:
        i) first ends of the plurality of cables exit out of the passageway first longitudinal end and are bundled together at a location beyond the first longitudinal end; and
        ii) second ends of at least some of the plurality of cables exit the passageway at the plurality of cable routing apertures;
        iii) wherein first ones of the plurality of cables exiting the cable routing apertures proximate the passageway first longitudinal end have a shorter length as compared to second ones of the plurality of cables exiting the cable routing apertures proximate the passageway second longitudinal end;
    wherein the at least one mounting feature is provided on a side of the end wall opposite the plurality of cables.

2. The cable management assembly of claim 1, further comprising:
    (a) a second cover connected to at least some of the plurality of cable management members.

3. The cable management assembly of claim 1, wherein the plurality of cables are copper based cables.

4. The cable management assembly of claim 3, wherein the plurality of cables are provided with RJ type connectors at both ends of each of the plurality of cables.

5. The cable management assembly of claim 1, wherein the plurality of cable management members includes a first plurality of cable management members extending from the first sidewall.

6. The cable management assembly of claim 5, wherein the plurality of cable management members includes a second plurality of cable management members extending from the second sidewall.

7. The cable management assembly of claim 6, wherein:
    (a) the first cover is connected to at least some of the first plurality of cable management members and to at least some of the second plurality of cable management members.

8. The cable management assembly of claim 7, further comprising:
    (a) a second cover connected to at least some of the first plurality of cable management members and to at least some of the second plurality of cable management members.

9. The cable management assembly of claim 1, wherein the plurality of cable management members are separable components that are connected to the bracket.

10. The cable management assembly of claim 9, wherein the plurality of cable management members are connected to the bracket by a snap-fit connection.

11. The cable management assembly of claim 1, wherein the first cover is connected to the plurality of cable management members with separate clip members.

12. The cable management assembly of claim 11, wherein the clip members form a snap-fit type connection with the plurality of cable management members and form a snap-fit type connection with the first cover.

13. The cable management assembly of claim 1, wherein the cable management members are integrally formed within at least one of the first and second sidewalls.

14. The cable management assembly of claim 13, wherein the bracket end wall, the first and second side walls, and the first cover are integrally formed together.

15. The cable management assembly of claim 1, wherein the at least one mounting feature includes a plurality of mounting features.

16. A cable management assembly installable onto and separate from a telecommunications rack, the cable management assembly comprising:
    (a) a plurality of cables terminated with connectors at each end, some of which have lengths that are different than lengths of others of the plurality of cables; and (b) a carrier assembly supporting the plurality of cables and including:
- a bracket including first and second sidewalls extending from an end wall to define an open channel, the bracket including a first end section, a central section, and a second end section, wherein the bracket includes at least one mounting feature located on the end wall at a location across which the plurality of cables do not extend such that the bracket can be mounted to the telecommunications rack with the plurality of cables supported by the carrier; and
- a plurality of cable management members extending from the bracket first and second end sections, the plurality of cable management members defining a plurality of cable routing apertures through which at least some of the plurality of cables extend, wherein the end wall of the bracket is mountable to the telecommunications rack with the plurality of cables mounted within the carrier assembly;
- a first cover connected to and supported by distal ends of the plurality of cable management members and facing the bracket end wall of the first end section, the first cover securing some of the plurality of cables within a first interior area defined by the bracket and the plurality of cable management members; and
- a second cover connected to and supported by distal ends of the plurality of cable management members and facing the bracket end wall of the second end section, the second cover securing some of the plurality of cables within a second interior area defined by the bracket and the plurality of cable management members;
- wherein the plurality of cables secured within the first and second interior areas extend longitudinally beyond the first and second interior areas and into the bracket central section, and further extend out of the bracket open channel;
- wherein the at least one mounting feature is provided on a side of the end wall opposite the plurality of cables.

* * * * *